(12) United States Patent
Wentworth et al.

(10) Patent No.: US 6,261,027 B1
(45) Date of Patent: *Jul. 17, 2001

(54) PORTABLE PULLING APPARATUS

(75) Inventors: Steven W. Wentworth, Brookfield; Robert F. Crane, Oconomowoc, both of WI (US)

(73) Assignee: Earth Tool Company L.L.C., Oconomowoc, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,893

(22) Filed: Jul. 7, 1997

(51) Int. Cl.$^7$ ........................................ F16L 1/00
(52) U.S. Cl. .................. 405/184; 405/174; 242/406; 242/397.5; 173/46; 254/227; 254/334; 254/362; 254/335; 29/423
(58) Field of Search ............... 173/46; 405/184, 405/174; 29/423; 242/406, 390, 390.8, 397.5; 254/227, 362, 334

(56) References Cited

U.S. PATENT DOCUMENTS

| | | |
|---|---|---|
| Re. 33,793 | 1/1992 | Cherrington . |
| 2,236,305 * | 3/1941 | Ahlin . |
| 2,284,532 * | 5/1942 | Napier . |
| 2,896,911 * | 7/1959 | Carpenter . |
| 2,990,160 * | 6/1961 | Foley . |
| 3,452,545 * | 7/1969 | Malloy ....................... 61/35 |
| 3,558,101 * | 1/1971 | Ward ......................... 254/51 |
| 3,850,410 | 11/1974 | Kemp ....................... 254/186 |
| 3,970,157 * | 7/1976 | Schmidt .................... 175/22 |
| 4,252,472 * | 2/1981 | Moraly ..................... 405/244 |
| 4,284,147 * | 8/1981 | Jenne ....................... 173/91 |
| 4,437,622 * | 3/1984 | Heider . |
| 4,459,787 * | 7/1984 | Wilcox ..................... 52/155 |
| 4,667,746 * | 5/1987 | Moraly ..................... 173/89 |
| 4,685,831 * | 8/1987 | Mahoney ................. 405/156 |
| 4,945,999 | 8/1990 | Malzahn . |
| 4,953,633 | 9/1990 | Hermans . |
| 5,025,868 | 6/1991 | Wentworth et al. . |
| 5,070,948 | 12/1991 | Malzahn . |
| 5,112,158 * | 5/1992 | McConnell .............. 405/154 |
| 5,161,626 * | 11/1992 | Laftkas .................... 175/22 |
| 5,211,510 * | 5/1993 | Kimura et al. ........... 405/184 |
| 5,242,026 | 9/1993 | Deken et al. . |
| 5,337,837 | 8/1994 | Wentworth et al. . |
| 5,427,475 * | 6/1995 | Coss ......................... 405/184 |
| 5,511,929 * | 4/1996 | Loftus . |
| 5,584,444 * | 12/1996 | Farmer . |
| 5,651,639 | 7/1997 | Wentworth et al. . |
| 6,109,832 * | 8/2000 | Lincoln ................... 405/184 |
| 6,149,346 * | 11/2000 | Takamatsu et al. ..... 405/156 |
| 6,149,349 * | 11/2000 | Nikiforuk et al. ....... 405/184 |
| 6,183,163 * | 2/2001 | Nikiforov et al. ....... 405/184 |

FOREIGN PATENT DOCUMENTS

| | | | |
|---|---|---|---|
| 3815 263 * | 11/1989 | (DE) | ........................ 405/184 |
| 306 112 * | 3/1989 | (EP) | ........................ 405/184 |

* cited by examiner

Primary Examiner—S. Thomas Hughes
Assistant Examiner—Essama Omgba
(74) Attorney, Agent, or Firm—Philip G. Meyers; Philip G. Myers Intellectual Property Law, P.C.

(57) ABSTRACT

The present invention provides a portable pulling apparatus suitable for mounting in an exit pit during installation of a pipeline. A portable pulling apparatus of the invention includes an elongated stake having a lower end portion configured for insertion into the ground and an upper end portion. A winch including a pulling cable is mounted on the upper end portion of the stake by a suitable fixture. The winch can then operate to exert a horizontal pulling force on a cable and is secured against movement when the lower end portion of the stake is inserted into the ground. Such a pulling apparatus can be used in a method of installing an underground pipe according to the invention.

12 Claims, 4 Drawing Sheets

PORTABLE PULLING APPARATUS

TECHNICAL FIELD

This invention relates to a portable pulling machine useful in combination with a pneumatic impact ground piercing tool for installing an underground pipeline.

BACKGROUND OF THE INVENTION

Self-propelled pneumatic tools for making small diameter holes through soil are well known. Such tools are used to form holes for pipes or cables beneath roadways without need for digging a trench across the roadway. These tools include, as general components, a torpedo-shaped body having a tapered nose and an open rear end, an air supply hose which enters the rear of the tool and connects it to an air compressor, a piston or striker disposed for reciprocal movement within the tool, and an air distributing mechanism for causing the striker to move rapidly back and forth. The striker impacts against the front wall (anvil) of the interior of the tool body, causing the tool to move violently forward into the soil. The friction between the outside of the tool body and the surrounding soil tends to hold the tool in place as the striker moves back for another blow, resulting in incremental forward movement through the soil. Exhaust passages are provided in the tail assembly of the tool to allow spent compressed air to escape into the atmosphere.

Most impact ground piercing tools of this type have a valveless air distributing mechanism which utilizes a stepped air inlet. The step of the air inlet is in sliding, sealing contact with a tubular cavity in the rear of the striker. The striker has radial passages through the tubular wall surrounding this cavity, and an outer bearing surface of enlarged diameter at the rear end of the striker. This bearing surface engages the inner surface of the tool body.

Air fed into the tool enters the cavity in the striker through the air inlet, creating a constant pressure which urges the striker forward. When the striker has moved forward sufficiently far so that the radial passages clear the front end of the step, compressed air enters the space between the striker and the body ahead of the bearing surface at the rear of the striker. Since the cross-sectional area of the front of the striker is greater than the cross-sectional area of its rear cavity, the net force exerted by the compressed air now urges the striker backwards instead of forwards. This generally happens just after the striker has imparted a blow to the anvil at the front of the tool.

As the striker moves rearwardly, the radial holes pass back over the step and isolate the front chamber of the tool from the compressed air supply. The momentum of the striker carries it rearward until the radial holes clear the rear end of the step. At this time the pressure in the front chamber is relieved because the air therein rushes out through the radial holes and passes through exhaust passages at the rear of the tool into the atmosphere. The pressure in the rear cavity of the striker, which defines a constant pressure chamber together with the stepped air inlet, then causes the striker to move forwardly again, and the cycle is repeated.

In some prior tools, the air inlet includes a separate air inlet pipe, which is secured to the body by a radial flange having exhaust holes therethrough, and a stepped bushing connected to the air inlet pipe by a flexible hose. These tools have been made reversible by providing a threaded connection between the air inlet sleeve and the surrounding structure which holds the air inlet concentric with the tool body. The threaded connection allows the operator to rotate the air supply hose and thereby displace the stepped air inlet rearwardly relative to the striker. Since the stroke of the striker is determined by the position of the step, i.e., the positions at which the radial holes are uncovered, rearward displacement of the stepped air inlet causes the striker to hit against the tail nut at the rear of the tool instead of the front anvil, driving the tool rearward out of the hole. See, for example, Wentworth et al. U.S. Pat. Nos. 5,025,868 and 5,337,837.

Expanders are tapered, ring-shaped shells that fit over the tapered nose portion of an earth boring tool in order to widen the hole made by the tool as it passes through the ground. In this manner, a 4-inch diameter tool may be used to make a 6- or 8-inch diameter hole. The tool is often sent through to make an initial bore, and then sent through a second time with the expander in order to widen the existing hole and/or crack an existing pipe. According to a known method, a plastic pipe may be attached to the back of the expander with the above described reversible tool inside the pipe so that the pipe is installed as the tool bores through the soil, with or without additional widening of the bore. The tool body is disposed inside the replacement pipe, and in this arrangement friction between the expander and the soil serves to keep the tool and expander from moving backward during the rearward stroke of the striker.

Problems are encountered as the tool advances further into the ground and the weight of the pipe being drawn behind the tool grows progressively greater. The ground piercing tool relies on friction with the surrounding soil to prevent it from moving backward during the rearward stroke of the striker the same distance the tool moved forward when the striker made its forward impact. The elasticity of the pipe drawn behind the tool can counteract this frictional force, slowing and eventually stopping the tool.

To remedy this difficulty, it is known to attach a cable to the front end of the impact ground piercing tool and use a winch to apply a continuous pulling force to the tool in the forward direction. The cable is threaded through the existing pipeline or a pilot hole and serves to keep the tool moving and prevent it from deviating from its proper course. While it is possible to push on the existing pipeline from behind instead of pulling on the ground piercing tool using a cable, the pushing operation is less effective because it increases the chance that the ground piercing tool will deviate from the desired path.

In most pipe replacement operations, entry and exit pits must be dug at the end of the run. The cable used to pull on the ground piercing tool emerges into the exit pit and must be directed up to the winch, which is generally a large, truck mounted unit with a capacity greatly exceeding the amount of pulling force needed to keep the ground piercing tool moving. Setting up the winch for pulling is a cumbersome operation because the winch cannot readily be placed and secured directly in the exit pit. The present invention addresses this problem.

Directional boring machines are large, hydraulic rod pushing and pulling systems with the capability of rotating the string of rods (drill string). See, for example, units shown in Malzahn U.S. Pat. Nos. 4,945,999 and 5,070,948, Cherrington U.S. Pat. No. 4,697,775 (RE 33,793), Dunn U.S. Pat. No. 4,953,633 and Deken et al. U.S. Pat. No. 5,242,026. Large directional boring machines generate tremendous reaction forces, and thus it has become standard practice to secure the corners of the machine to the ground with tubular stakes several feet in length. A pneumatic ground piercing tool of the same type used to pull the replacement pipe is fitted on the inside of the tubular stake and used to drive the stake into the ground in a few seconds. Reversing the tool causes the tool to emerge from the ground, leaving the stake intact. The stake has been removed by replacing the tool in the stake, removably securing an insert to the stake in a position behind the tool, and then running the tool in reverse.

SUMMARY OF THE INVENTION

The present invention provides a portable pulling apparatus suitable for mounting in an exit pit. A portable pulling apparatus of the invention includes an elongated stake having a lower end portion configured for insertion into the ground and an upper end portion. A winch including a pulling cable is mounted on the upper end portion of the stake by a suitable fixture. The winch can then operate to exert a horizontal pulling force on a cable and is secured against movement when the lower end portion of the stake is inserted into the ground.

Such a pulling apparatus can be used in a method of installing an underground pipe according to the invention. Such a method comprises the steps of:

connecting a pipe to be installed to a ground piercing tool so that the pipe moves forward as the tool moves forward;

positioning the ground piercing tool for entry into an existing underground opening at a front end of the opening;

mounting a portable pulling apparatus near a rear end of the existing underground opening, which apparatus includes an elongated stake having a lower end portion configured for insertion into the ground and an upper end portion, a winch, and a fixture that mounts the winch on the upper end portion of the stake, wherein the pulling apparatus is mounted by driving the lower end portion of the stake into the ground;

feeding a cable from the winch through the underground opening and connecting the cable to the ground piercing tool; and operating the ground piercing tool in forward mode to pull the pipe into an existing opening while pulling the tool forward using the winch to pull the cable. Such a method permits long runs of underground pipe to be installed at lesser cost and labor than previously known methods, as described in detail hereafter.

Other objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWING

The invention will hereafter be described with reference to the accompanying drawing, wherein like numerals denote like elements, and.

DETAILED DESCRIPTION OF PREFERRED EMBODIMENTS

Figure 1:
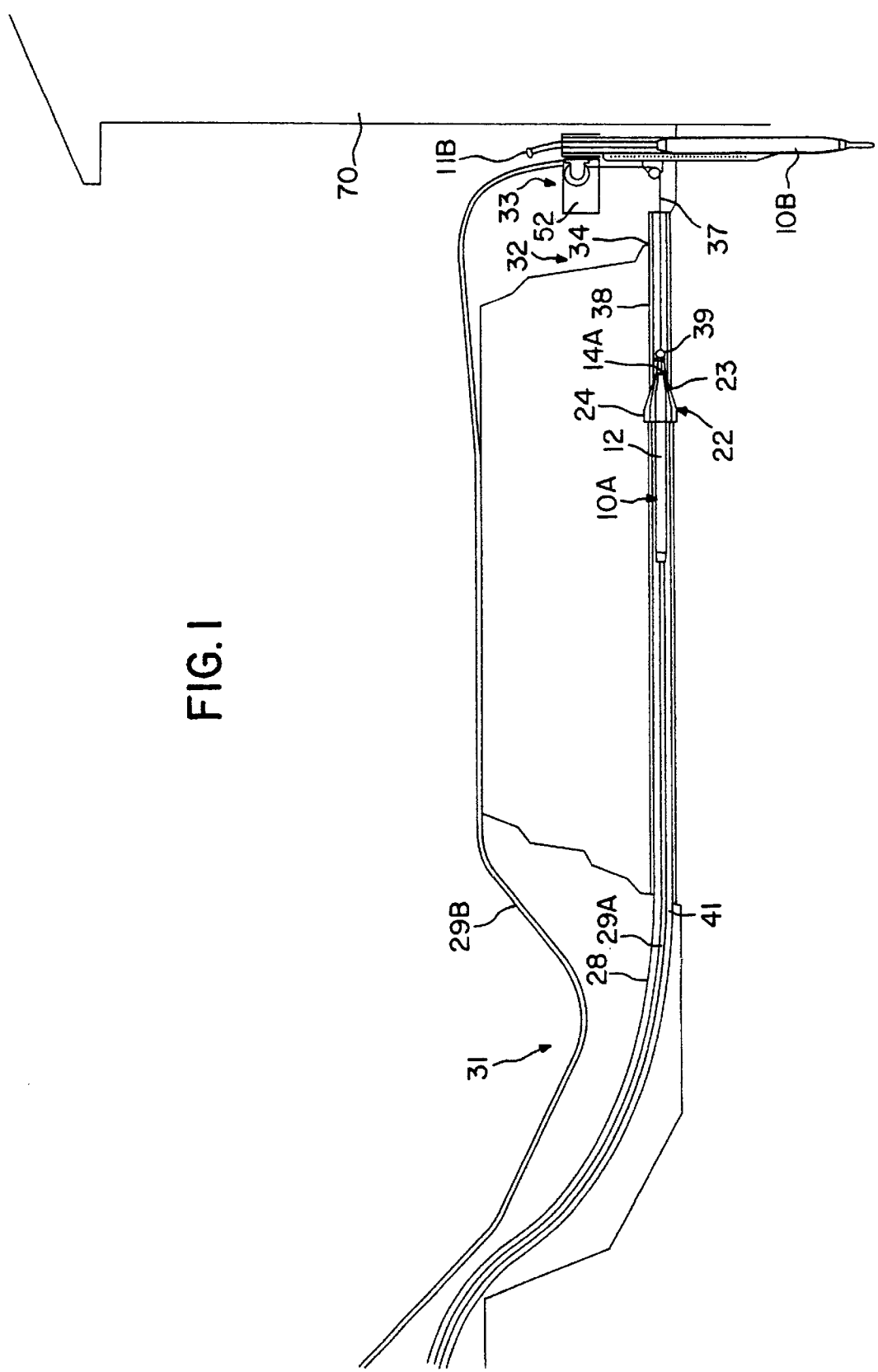
FIG. 1 is a lengthwise view, partly in section, illustrating the pipe installation method of the present invention.

Referring now to the drawings, FIG. 1 illustrates the method of the invention. A first pneumatic ground piercing tool 10A includes an elongated tool body 12A having a tapered nose or head assembly 14A. The type of tool employed is advantageously one which has a reversing mechanism, so that the tool can be run in reverse to disengage it from an expander as described hereafter. Such reversible tools are shown in Wentworth et al. U.S. Pat. Nos. 5,025,868 and 5,337,837, the contents of which are incorporated by reference herein.

Ground piercing tool 10A is provided with an expander 22 including a front, frustoconical section 23, optionally with external bursting blades, and configured to fit closely onto the tapered nose 14A of the tool. A pipe 28, such as a PVC or PE plastic pipe, is inserted inside (or outside) of a rear cylindrical section 24 of expander 22 and is secured to expander 22 by any suitable means, such as screws extending through radial holes in section 24 into pipe 28. In the alternative, pipe 28 may be connected to tool 10A by a suitable coupling device in a manner known in the art so that it follows behind tool 10A, and expander 22 may be omitted. In the latter arrangement, the replacement pipe 28 is connected to the rear end of the impact tool 10A. A first air hose 29A connected to an air compressor (not shown) runs through pipe 28 and supplies compressed air to operate tool 10A.

According to the method of the invention, pipe 28 is connected to expander 22 in a front (launch) pit 31. At a rear (exit) pit 32, a pulling apparatus 33 according to the invention is positioned near an exit opening 34 of an existing pipeline 38, such as a 4-inch diameter clay pipe, to provide a pulling force on a steel cable 37 which extends in the axial direction through the interior of existing pipeline 38. Cable 37 may be threaded by hand using a fiberglass rod through pipeline 38 and is attached to an eye 39 provided on the front end of tool 10A. Cable 37 may comprise a steel cable, chain, rope, or other similar device.

Pulling apparatus 33 is then operated to provide a continuous pulling force on tool 10A and the new pipe 28 in a manner described hereafter. Tool 10A is placed with expander 22 in contact with an entrance opening 41 of the existing pipeline or opening 38, and then operated in forward mode. Tool 10A moves progressively through the existing pipeline 38 as shown. Expander 22 bursts (shatters or slits) pipeline 38 while tool 10A drags the new pipe 28 into position behind expander 22. For a three inch diameter tool 10A used to install a four inch pipe, it has been found that the pulling apparatus is often needed to advance the run beyond about 50 feet or so in length. In general, according to a preferred form of the invention, pulling apparatus 33 is used in situations where the entrance and exit openings 41, 34 are more than about 50 feet apart. In either case, the pulling force in the lengthwise direction of the pipeline 38 also prevents tool 10A from going off course.

FIGS. 2 through 6 illustrate one form of apparatus 33 according to the invention. Pulling apparatus 33 includes an elongated, tubular steel stake 51, a winch 52, and a fixture 53 for mounting winch 52 on an upper end portion of stake 51. Steel stake 51 has a reduced diameter bottom portion 54.

In the illustrated embodiment, bottom portion 54 is tapered to complement the taper of a nose portion 14B of a second pneumatic impact tool 10B used to drive stake 51 into the ground. Stake 51 may have one or more spaced fins 56 (for example, three equiangular fins) provided to help the stake hold its position.

Winch 52 may be a conventional electric unit or a pneumatic unit such as a Thern model 4771. Winch 52 includes a motor disposed within a housing 61 and a cable winding drum 62 on which cable 37 is wound and unwound during operation. As shown in FIG. 1, winch 52 may be run using the same air hose 29B used to run the impact tool 10B by uncoupling hose 29B from a coupling 11B and attaching it to winch 52.

Figure 3:
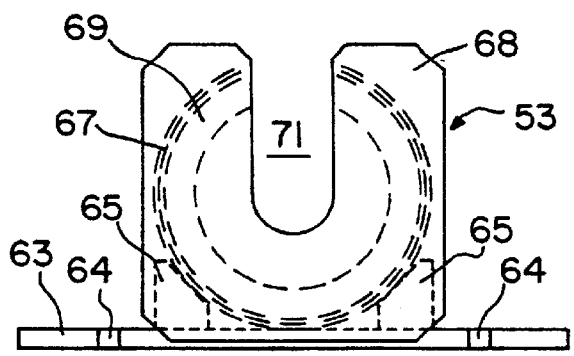
FIG. 3 is a top view, with underlying parts shown in phantom, of the mounting device shown in FIG. 2.
Figure 4:
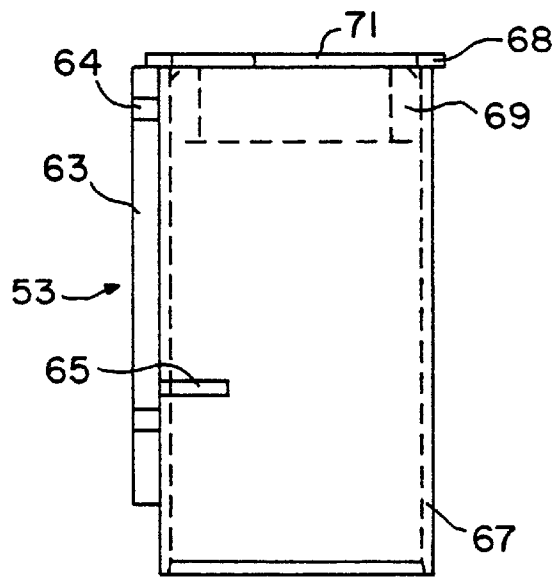
FIG. 4 is a side view, with underlying parts shown in phantom, of the mounting device shown in FIG. 3.
Figure 5:
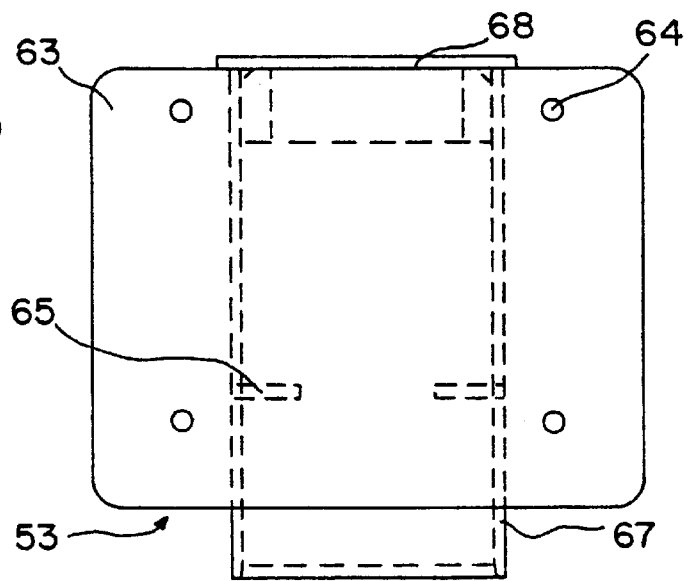
FIG. 5 is a front view, with underlying parts shown in phantom, of the mounting device shown in FIG. 3.
Figure 6:
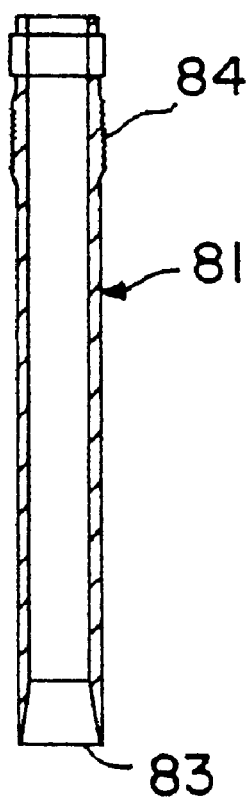
FIG. 6 is lengthwise sectional view of an insert used in the apparatus shown in FIG. 2.

Fixture 53 is used to mount winch 52 on the upper end of stake 51. Fixture 53 includes a bracket plate 63 having holes 64 by which winch 52 is mounted to plate 63 by suitable means such as welding or nuts and bolts 66 as shown. Plate 63 is welded to the side of a cylindrical sleeve 67 having an inner diameter slightly greater than the outer diameter of stake 51, and a pair of gussets 65 may similarly be welded between plate 63 and sleeve 67 to provide the fixture with additional strength. A lid 68 having an annular flange 69 fits closely in the upper end of sleeve 67. As shown in FIG. 3, lid 68 has a central slot or similar aperture 71 through which an air hose 29B can pass.

Stake 51 may be provided with a tubular extension 72 at its upper end to make up a difference in diameter between stake 51 and sleeve 67. Threads 73 are provided on an inner surface of extension 72 for engagement with a tubular insert 81 as described hereafter. Spacers 74 may be provided on the outside of stake 51 at an upper end portion 76 thereof so that sleeve 67 fits securely onto upper end portion 76 of stake 51.

At least one fin 56 acts as an external bracket that extends from upper end portion 76 of stake 51. A row of spaced holes 77 in fin 56 permit a pulley 78 to be mounted over a range of positions as needed to center cable 37 horizontally within the existing pipeline 38. Pulley 78 includes a rotatable grooved wheel 79 mounted on a plate 80 which is secured to fin 56 by nut and bolt assemblies 82. Cable 37 extends downwardly from winch drum 62 and is wound approximately 90° about wheel 79 so that it can extend into the pipeline 38.

Figure 2:
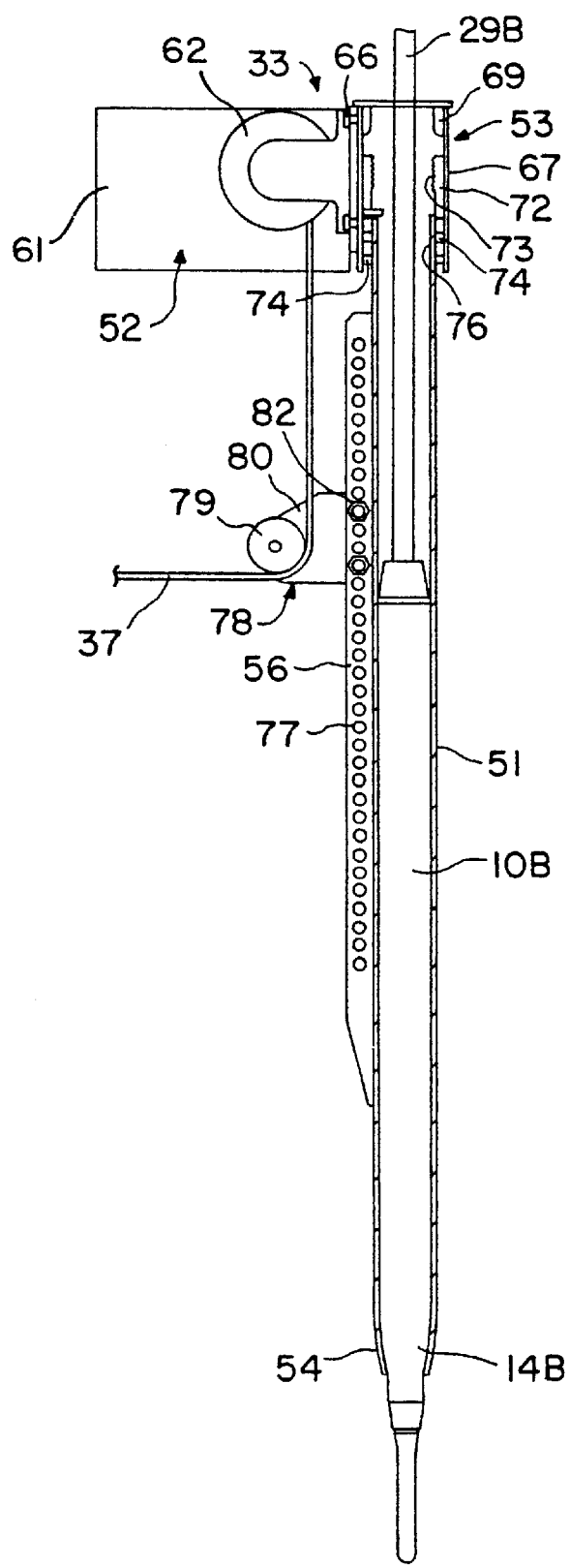
FIG. 2 is a lengthwise view, partly in section, of an embodiment of the apparatus of the invention shown in use in FIG. 1.

Apparatus 33 is able to apply a continuous pulling force on tool 10A which keeps tool 10A moving forward even over long pipeline runs without the need for a large, truck mounted winch. Installation in the exit pit 32 is carried out by placing tool 10B into the bottom of stake 51 as shown in FIG. 2 with tapered surfaces in engagement as shown. Winch 52 and fixture 53 may be removed temporarily and remounted once stake 51 has been set.

Tool 10B is run in forward mode to drive a lower end portion of stake 51 into the ground a sufficient distance so that stake 51 will remain secure. Tool 10B may be left in place until it is time to remove stake 51, and for that purpose slot 71 in lid 68 allows hose 29B to remain in position. In the alternative, tool 10B may be run in reverse to disengage nose 14B from tapered lower end portion 54 and then removed through the top of stake 51, freeing tool 10B for other work, such as setting a stake for another run while the current run is in progress. Tools 10A, 10B may be of the same or different size and type.

Once the current run is complete or the need for the additional pulling force supplied by the winch has ended, tool 10B is replaced at the bottom of stake 51 (if previously removed) and tubular insert 81 is inserted into stake 51 behind tool 10B. Insert 81 is rotated so that external threads 84 of insert 81 are brought into engagement with threads 73 and a bottom end 83 of insert 81 contacts the back of tool 10B. Tool 10B is then run in reverse, and the presence of insert 81 securely attached to stake 51 retracts stake 51 out of the ground together with tool 10B. Insert 81 is then unscrewed from inside of stake 51 so that tool 10B can be removed, or insert 10B may be left in place if the entire assembly will be used at another site a short distance away.

The method and apparatus of the invention provide considerable flexibility and are particularly advantageous in situations where there is limited space for the exit pit. Where the pipeline must connect to the foundation of a building 90 as shown in FIG. 1, it may be difficult or impossible to use a truck-mounted winch in the exit pit, which may adjoin a cinderblock foundation. The pulling apparatus of the present invention is small in size and can be installed and removed vertically, permitting use in small spaces.

It will be understood that the foregoing description is of preferred exemplary embodiments of the invention, and that the invention is not limited to the specific forms shown. For example, the method of the invention could be practiced for installation of a cable instead of a pipe, or without attaching the pipe to the ground piercing tool. In the latter case, the pipe can be inserted manually into the expanded pipeline hole after the run is complete. The ground piercing tool can be a directional boring machine or rod pusher which pushes the expander from behind while the apparatus of the invention pulls from the front. These options, however, are not preferred because a string of rods extending down an existing pipeline of greater diameter tend to buckle. These and other modifications may be made in without departing from the scope of the invention as expressed in the appended claims.

What is claimed is:

1. A portable pulling apparatus, comprising:

an elongated stake having a lower end portion configured for insertion into the ground and an upper end portion;

a winch including a pulling cable and a motor for pulling the cable;

a fixture for mounting the winch on the upper end portion of the stake so that the winch can operate to exert a horizontal pulling force with the cable and is secured against movement when the lower end portion of the stake is inserted into the ground;

a pulley mounted on the bracket below the winch in a position suitable to receive a vertical cable from the winch and direct the cable horizontally for attachment to an object to be pulled;

an external bracket elongated in the lengthwise direction of the stake spanning the upper and lower end portions of the stake and extending laterally therefrom, which bracket defines a series of spaced mounting positions thereon, whereby the pulley can be mounted at varying vertical spacings from the winch.

2. A portable pulling apparatus, comprising:

an elongated stake having a lower end portion configured for insertion into the ground and an upper end portion;

a winch including a pulling cable and a motor for pulling the cable;

a fixture for mounting the winch on the upper end portion of the stake so that the winch can operate to exert a horizontal pulling force with the cable and is secured against movement when the lower end portion of the stake is inserted into the ground;

an external bracket positioned below the winch and fixedly mounted to the upper end stake portion such that the bracket extends outwardly therefrom; and a pulley mounted on the bracket below the winch in a position suitable to receive a vertical cable from the winch and direct the cable horizontally for attachment to an object to be pulled.

3. A portable pulling apparatus, comprising:

an elongated stake having a lower end portion configured for insertion into the ground and an upper end portion;

a winch including a pulling cable and a motor for pulling the cable;

a fixture for mounting the winch on the upper end portion of the stake so that the winch can operate to exert a horizontal pulling force with the cable and is secured against movement when the lower end portion of the stake is inserted into the ground;

an external bracket extending from the upper end portion of the stake, the external bracket including a fin elongated in the lengthwise direction of the stake and spanning the upper and lower end portions of the stake, which fin has a series of spaced holes and;

a pulley mounted to two or more of the spaced holes by mechanical fasteners, wherein the series of spaced holes define a range of positions so that the pulley can be mounted at varying spacings from the winch in a position suitable to receive a vertical cable from the winch and direct the cable horizontally for attachment to an object to be pulled.

4. The portable pulling apparatus of claim 3 wherein the stake comprises a metal tube.

5. The portable pulling apparatus of claim 3 wherein the stake has a lower end inner portion configured to engage a corresponding nose portion of a pneumatic ground piercing tool, and an opening at an upper end thereof into which an air hose for a pneumatic ground piercing tool can extend.

6. The portable pulling apparatus of claim 3 wherein the lower inner end portion of the stake has a tapered surface which engages a tapered nose portion of the ground piercing tool.

7. The portable pulling apparatus of claim 3 wherein the stake comprises a tube, and the fixture includes a can-shaped portion that fits over a top end of the tube, means for securing the can-shaped portion to a housing of the winch, and spacers on an inner wall of the can shaped-portion for maintaining close conforming contact with an exterior surface of the stake.

8. The portable pulling apparatus of claim 3 further comprising an insert configured to fit inside the upper portion of the stake in position for contact with a rear end of a pneumatic ground piercing tool disposed in the lower end portion of the stake, and means for securing the insert in the stake so that reverse operation of the pneumatic ground piercing tool extracts the stake from the ground.

9. The apparatus of claim 3, wherein the motor is an electric motor.

10. The apparatus of claim 3, wherein the motor is a pneumatic motor.

11. A portable pulling apparatus, comprising:

an elongated stake having a lower end portion configured for insertion into the ground and an upper end portion, the lower end inner portion configured to engage a corresponding nose portion of a pneumatic ground piercing tool, and an opening at an upper end thereof into which an air hose for a pneumatic ground piercing tool can extend;

a winch including a pulling cable and a motor for pulling the cable;

a fixture for mounting the winch on the upper end portion of the stake so that the winch can operate to exert a horizontal pulling force with the cable and is secured against movement when the lower end portion of the stake is inserted into the ground; and an insert configured to fit inside the upper portion of the stake in position for contact with a rear end of a pneumatic ground piercing tool disposed in the lower end portion of the stake, and means for securing the insert in the stake so that reverse operation of the pneumatic ground piercing tool extracts the stake from the ground.

12. The apparatus of claim 11, wherein the securing means comprises external threads on the insert which engage internal threads on an inner wall of the stake.

\* \* \* \* \*